United States Patent [19]
Renfrew

[11] 3,787,178
[45] Jan. 22, 1974

[54] POLYESTER TEXTILE FIBERS DYED WITH THIAZOLE OR BENZOTHIAZOLE CARBAZOLE DYES

[75] Inventor: Edgar Earl Renfrew, Lock Haven, Pa.

[73] Assignee: American Aniline Products, Inc., Lock Haven, Pa.

[22] Filed: Feb. 28, 1972

[21] Appl. No.: 230,111

[52] U.S. Cl. .................. 8/41 C, 260/158, 260/164
[51] Int. Cl. ...................... D06p 3/52, C09b 29/36
[58] Field of Search..... 260/158, 164; 8/41 R, 41 C; 117/138.8 F

[56] References Cited
FOREIGN PATENTS OR APPLICATIONS
367,254    3/1963    Switzerland.......................... 8/41 C

*Primary Examiner*—Donald Levy
*Assistant Examiner*—Bruce H. Hess
*Attorney, Agent, or Firm*—James E. Armstrong et al.

[57] ABSTRACT

A new series of azo dyes is produced by coupling a diazotized heterocylic amine base with a carbazole coupler. The compounds of the invention are excellent dyes for polyester fabrics and also are pigments for rigid plastic materials.

3 Claims, No Drawings

POLYESTER TEXTILE FIBERS DYED WITH THIAZOLE OR BENZOTHIAZOLE CARBAZOLE DYES

BACKGROUND OF THE INVENTION

Although azo dyes have been long known in the art, including the art of dyeing modern fabrics such as polyethylene terephthalate, the search for new azo dyes has continued due to the increased requirements for excellent characteristics which are necessary for present day dyeing procedures. Thus, it is necessary that a modern dye for polyester possess excellent fastness to sublimation in order to be usable in thermofixation processes. Therefore, many of the compounds which, a few years ago, were thought to be excellent dyes for polyester due to properties of good build up and depth, are no longer satisfactory due to their being unsatisfactory in the more sophisticated modern dyeing processes.

In the prior art there are many attempts made at producing azo dyes with traditional aromatic bases and aromatic couplers. Several deviations from the classical use of both an aromatic base and aromatic coupler have been proposed. For example, complicated carbozoles have been proposed as couplers with primary aromatic amine bases by Fischer, U.S. Pat. Nos. 2,204,958 and 2,222,763, and Grimmel et al, U.S. Pat. No. 2,408,421. In each of these patents, a primary aromatic amine, properly diazotized, is coupled with a hydroxy carbazole component. The compounds of the prior art are thus unlike those of the present invention structurally, and suffer the further disadvantage that relatively complex carbazoles are required for coupling with the aromatic amine. Properties of the dyes lack the resistance to light fastness found in dyes of the present invention. Muth, U.S. Pat. No. 2,032,627 used aminocarbazoles as diazotizable bases to form ingrain colors on cotton prepared with naphthol couplers. The structures of the dyes are thus very unlike those of the present invention, as is the intended usage.

I have now discovered a class of compounds which provide dyeings of excellent fastness of polyester, and which are derived from the reaction of a heterocyclic amine base, with a relatively simple carbazole coupler. The compounds of the invention also are pigments for rigid plastic materials.

SUMMARY OF THE INVENTION

In accordance with the invention, I have discovered a novel series of azo dyes of the formula

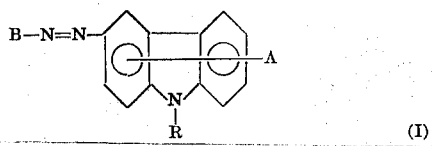

(I)

wherein B is a heterocyclic nucleus derived from a primary aromatic amine capable of forming a diazotized amine and having up to nine nuclear atoms, the nuclear atoms being selected from the group consisting of carbon, sulfur, nitrogen, and oxygen;

R is hydrogen or alk-X, alk being alkylene of up to nine carbon atoms and X being hydrogen, cyano, phenyl, hydroxy, chloro, bromo, or lower alkoxy; and A is hydrogen, halogen, lower alkyl or lower alkoxy.

A preferred class of compounds within the scope of the invention has the formula

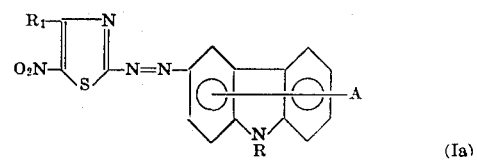

(Ia)

wherein $R_1$ is hydrogen or methyl and A and R are as defined above.

Another preferred class of compounds within the scope of the invention has the formula

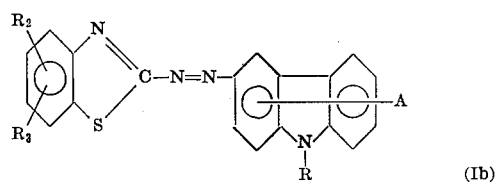

(Ib)

wherein each of $R_2$ and $R_3$ is independently selected from the group consisting of hydrogen, lower alkyl, lower alkoxy, chloro, bromo, nitro, sulfamyl, N-(lower alkyl)sulfamyl, N,N-di(lower alkyl)sulfamyl, cyano, and lower alkyl-sulfonyl; and A and R are as defined above.

DETAILED DESCRIPTION OF THE INVENTION

The compounds of the invention are produced through the coupling of a carbazole based with a diazotized heterocyclic amine.

The carbazole base has the formula

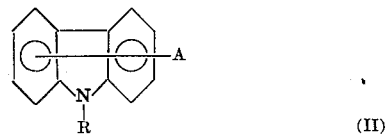

(II)

wherein A and R are as defined above. The diazotized heterocyclic amine has the formula

B — N$^+$ ≡ N          (III)

wherein B is as defined above. The diazotized heterocyclic amine (III) is produced through conventional procedures from a primary heterocyclic amine of the formula

B — NH$_2$          (IV)

As used in this case, the term "lower" refers to an aliphatic grouping of less than about four carbon atoms, for example, methyl, ethyl, propyl and butyl. As halogen atoms may be mentioned bromine and chlorine.

The compounds of the invention when dispersed have been found to be excellent dyes for polyesters. They also may be used to pigment rigid plastic substrates.

The base (IV) is diazotized in the usual way by heating it in an aqueous solution of strong mineral acid such as hydrochloric or phosphoric acid, cooling the resulting solution to a temperature of 0°–10°C and adding thereto a quantity of sodium nitrite slightly in excess of the stoichiometric requirement. An alternate method of diazotization which is especially useful for less basic aminobenzenes involves dissolving sodium nitrite in concentrated sulfuric acid, heating to a temperature of about 60°–70°C, cooling the resulting solution to 0°–10°C and adding thereto the aminobenzene.

The azo dyes of the invention are made by the reaction of the diazotized base (III) with the coupler (II) by adding the diazonium salt to a cold aqueous solution of the coupler. A buffering agent, such as sodium acetate is added to reduce the acidity to a pH of 5 to 7. The mixture is allowed to react for up to several hours at room temperature and is thereafter filtered and washed acid free. The desired azo product is thus obtained in the form of a wet cake.

To prepare the product for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standarization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standarized to 25–60 percent by weight color content (pure color).

The dye, when added to water with or without auxiliary agents, forms a near colloidal aqueous dispersion from which the aromatic polyester fiber or textile material is dyed in the conventional manner at 40°–100°C (104°–212°F) to give a colored fiber containing about 0.01–2 percent by weight dye (100% color basis).

Alternatively, dyeing may be accomplished without a carrier at temperatures of 100°–150°C under pressure. Also, the dye may be applied in patterns by conventional printing methods, if desired.

The dye can also be applied to the aromatic polyester fiber by thermofixation methods, such as the Thermosol process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C (356°–428°F) are used for 30 to 90 seconds. If the fabric contains cotton or viscose rayon, apart from synthetic fibers, there is little danger of damaging cellulosic portions, but if wool is present, the temperature must be kept within 180°–200°C and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

The compounds of the invention may be used for the coloration of rigid plastic substrates. The rigid plastic substrates contemplated within the scope of the invention are those plastic materials capable of being pigmented with the compounds of the invention, and will be referred to herein as "rigid plastic substrates". The rigid plastic substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified polysulfones; cellulosic derivatives, particularly esters such as cellulose acetate, propionate and butyrate; polyamides such as nylon; epoxy and phenolic resins; polycarbonates; and polyesters. It is understood that the rigid plastic substrates include those materials capable of being pigmented with the compounds of the invention, and therefore copolymers of the above classes of compounds, such as styrenebutadiene, are also within the scope of the invention.

Specific examples of thermoplastic resins include polyvinyl chloride, polyvinyl acetate, vinyl chloride/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate ethylene/ethyl methacrylate, ethylene/allyl alcohol, ethylene/allyl acetate, ethylene/allyl acetone, ethylene/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, and styrene/methyl methacrylate.

As preferred rigid plastic substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or milling apparatus. After the compounds and the plastic have been thoroughly mixed, the resultant colored mixture is shaped into the desired final form through procedures well known to those skilled in the art, such as pouring, calendering, extrusion, spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%.

EXAMPLE I 9-n-Butyl-3-(5-nitro-2-thiazolylazo)carbazole

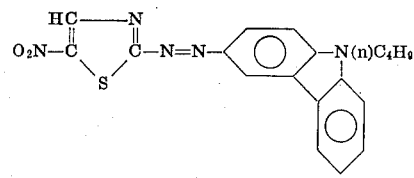

To a flask, fitted with a stirrer, a dropping funnel and a thermometer, was charged: 87.5 parts 66° Be sulfuric acid, followed below 15°C by 7.1 parts sodium nitrite. The mixture was heated to 65°C, cooled to 0°C, whereupon a mixture of 83 parts glacial acetic acid and 13.8 parts propionic acid was added; during the addition the temperature was maintained by external cooling at 0°–5°C. This was followed by the addition of 14.5 parts of 2-amino-5-nitrothiazole. After 2 hours stirring at 3°–6°C, a solution of 23.4 parts 9-n-butylcarbazole and 100 parts of glacial acetic acid, (previously heated to 43°C) was added in portions at 5° – 8°C; the mixture was stirred 16 hours during which period the temperature was allowed to rise to 28°C. It was then poured into 300 parts ice and 500 parts water, and stirred for 1 hour. 9-n-Butyl-3-(5-nitro-2-thiazolyl)carbazole was collected by filtration, washed acid free and dried. It melted at 156°–161°C.

One part of this product was combined with one part of dispersing agent (Lignosol FTA) and made into a 10% color content paste by ball milling. It dyed polyester fiber in bright bluish-red shades having good light fastness and sublimation resistance.

EXAMPLE II 9-n-Hexyl-3-(5-nitro-2-thiazolylazo)carbazole

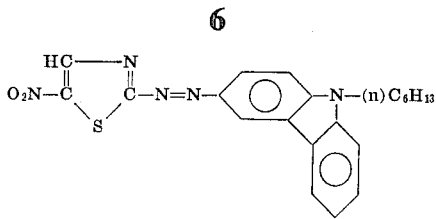

was prepared in a manner similar to that described in Example 4 by replacing 23.4 parts 9-butylcarbazole by 25.1 parts 9-n-hexylcarbazole. When made into a paste as described there the product, 9-n-hexyl-3-(5-nitro-2-thiazolyl) carbazole dyed polyester fabric in red-violet hues of good light fastness and sublimation resistance.

EXAMPLE III 9-n-Octyl-3-(5-nitro-2-thiazolylazo)carbazole

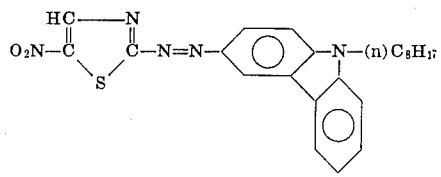

was prepared as in Example 4 by replacing 23.4 parts 9-butylcarbazole with 27.9 parts 9-n-octylcarbazole. When made into a paste as described in Example 4, the product dyed polyester fiber in bluish-pink shades of good lightfastness and excellent sublimation.

EXAMPLES IV TO XVI

When an equivalent amount of the carbazoles tabulated below are substituted for the N-n-butylcarbazole of Example I, and the procedure of Example I is otherwise followed, compounds which are dyes for polyethylene terephthalate are produced. The shade of polyethylene terephthalate when dyed with each of these compounds is given below:

| EXAMPLE | A | R₁ | R | SHADE OF POLYETHYLENE TEREPHTHALATE |
|---------|------|------|------|------|
| IV | 3-CH₃ | H | n-butyl | bluish-red |
| V | H | H | n-amyl | bluish-red |
| VI | H | H | n-heptyl | bluish-red |
| VII | 3-Cl | H | methyl | bluish-red |
| VIII | H | H | cyanoethyl | bluish-red |
| IX | H | H | benzyl | bluish-red |
| X | 3-CH₃ | CH₃ | n-butyl | violet |
| XI | H | CH₃ | benzyl | violet |
| XII | 3-Br | H | n-butyl | bluish-red |
| XIII | H | H | 2-hydroxyethyl | rubine |
| XIV | H | H | 2-chloroethyl | bordeaux |
| XV | 3-OCH₃ | H | 2-bromopropyl | bordeaux |
| XVI | 3-C₂H₅ | H | 2-methoxyethyl | rubine |

EXAMPLE XVII

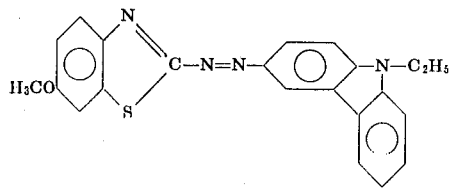

In a suitable vessel, 9.5 parts 2-amino-6-methoxybenzothiazol (95% purity) was dissolved in 113. parts sulfuric acid, 95%, at 80°–85°C. The solution was cooled to −2°C by external cooling, whereupon 3.5 parts sodium nitrite in 50 parts water was added dropwise, with the temperature always maintained below 3°C. After the addition, the mass was stirred for two hours at −5°C to 0°C. To the mass was added one-half part sulfamic acid.

To the above diazo mass was added a solution of 9.75 parts 9-ethylcarbazole in 85 parts sulfuric acid CONC. During the addition, the temperature was not allowed to rise above 3°C.

The mixture was stirred for 17 hours below 8°C, after which it was drowned into 1,500 parts water and ice. The solid was isolated by filtration and washed on the filter with cold water until the washings ran neutral. It was preserved as a moist cake.

A portion of the moist cake containing one part by weight 100% material was ball milled with one part of a lignin sulfonic acid material commercially available as a dispersing agent, Lignosol FTA, and eight parts water, including that which was charged as part of the moist cake. Milling was continued until a filter test showed that a satisfactory dispersion had been achieved.

Application of the paste by the established dyeing methods (carrier, thermofixation and pressure) on polyester and other fabrics afforded bright orange dyeings. These dyeings, under tests published by the AATCC were durable to the usual degradative factors for textiles such as exposure to light, alkaline washing and heat. Resistance to sublimation was exceptionally outstanding, showing no transfer at 400°F.

EXAMPLES XVIII TO XXXI

In the following examples, the procedure followed in Example XVII is used. In place of heterocyclic amine base of Example VII an equivalent amount of 2-aminobenzothiazole the same or other diazo components is used, the substituents on the benzothiazole nucleus being tabulated below. In place of the 9-ethyl carbazole of Example VII, an equivalent amount of the carbazole base tabulated below is used. The color of the dyeing of each of the compounds on polyethylene terephthalate is also given.

EXAMPLE XXXII

Methyl methacrylate resin is colored with the compound of claim 1 as the colorant, in a ratio of 2 grams resin to 1 mg colorant. The resin is prepared by placing 1 pound of methyl methacrylate into a Thropp mill (a 2-roller mill), which is then heated and run in order to melt and smash the resin to a molten mass. The compound of Example I is added and the entire mixture of resin and colorant is milled until the colorant is uniformly distributed in the mass as measured by eye. While still hot, 30 grams of the hot mass is cut off for use in the following procedure. The sample, containing 30 grams methyl methacrylate and 15 mg of the compound of Example I as colorant, may be conveniently molded in a Laboratory 40 Single Acting Watson-Stillman Laboratory Press (Farrel-Birmingham Co. 50-ton press). 30 grams of methyl methacrylate mixture containing 15 mg of the compound of Example I per pound of methyl methacrylate is placed in the cold mold, which is then closed with the Schrader Valve. The drain is opened and steam is applied to the mold. When steam comes through the drain pipe, the drain is closed. Up to 25.0 tons pressure is exerted on the chips until the mold is fully closed. This can conveniently be accomplished by observing the pressure gauge. When the gauge needle no longer decreases in pressure, the mold is then closed.

The mold is held closed at zero pressure by releasing the hydraulic pressure and maintaining the steam for 5 minutes. The mold pressure is increased to 10 tons and held for ten minutes, the steam remaining on.

The mold pressure is increased to 15 tons and the steam shut off; the drain is opened and cooling water is added for 5 minutes. Thereafter the pressure is changed to zero and the mold is opened to extract the resultant plastic chip.

EXAMPLE XXXIII

When the 30 gram mixture of methyl methacrylate and the compound of Example XXXIV are replaced by 2 pounds polystyrene, 10.44 grams titanium dioxide and 227 mg of the compound of Example I, the proce-

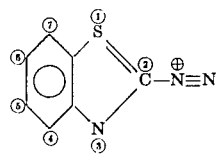

| EXAMPLE | BENZOTHIAZOLE SUBSTITUENTS | | | | A | R | SHADE ON POLYETHYLENE TEREPHTHALATE |
| | 4 | 5 | 6 | 7 | | | |
|---|---|---|---|---|---|---|---|
| XVIII | H | H | H | H | H | n-butyl | orange |
| XIX | H | H | Cl | H | H | methyl | reddish-orange |
| XX | H | H | OC$_2$H$_5$ | H | H | benzyl | reddish-orange |
| XXI | H | H | OCH$_3$ | H | H | cyanoethyl | reddish-orange |
| XXII | H | H | CH$_3$ | H | 3-CH$_3$ | n-butyl | reddish-orange |
| XXIII | H | H | SO$_2$NH$_2$ | H | H | 2-chloroethyl | scarlet |
| XXIV | H | H | SO$_2$NHCH$_3$ | H | H | n-butyl | scarlet |
| XXV | H | H | SO$_2$N(CH$_3$)$_2$ | H | 3-Cl | methyl | scarlet |
| XXVI | H | H | SO$_2$CH$_3$ | H | H | n-butyl | reddish-scarlet |
| XXVII | H | H | NO$_2$ | H | 3-Br | n-butyl | yellowish-red |
| XXVIII | H | H | CH$_3$CONH | H | 3-OCH$_3$ | 2-bromopropyl | scarlet |
| XXIX | Cl | H | Cl | H | 3-C$_2$H$_5$ | 2-methoxyethyl | scarlet |
| XXX | NO$_2$ | H | NO$_2$ | H | H | n-butyl | bluish-red |
| XXXI | H | Cl | Cl | H | H | n-butyl | yellowish-red | dure of Example II being otherwise followed, a fast coloration of the polystyrene is obtained.

EXAMPLE XXXIV

The compound of Example X may also be used as a colorant for plastics made from polycarbonates. A pigmented plastic material of polycarbonates and compound of Example I may be prepared according to the following procedure:

A specimen is prepared by dry mixing pelletized or powder resin with finely divided colorant until uniform distribution is achieved of the colorant in the resin material. Plasticizer may also be added, if desired. The mixture is then extruded or injected molded under suitable conditions. 454 gms Lexan 121–R (General Electric) pellets are placed in Bipel one ounce reciprocating screw injection molder. The pellets are tumbled for five minutes on the barrel tumbler. The resin is heated (front zone temperature of 550°F and rear zone temperature of 500°F) and chips are produced from the virgin resin until chips of good quality are obtained. When the desired quality of chips are obtained with the clear resin, a fresh batch of Lexan 121–R, containing the compound of Example I in an equivalent amount corresponding to Example XXXII to produce a pigmented plastic material is fed into the injection molder, to produce pigmented chips having excellent fastness characteristics.

EXAMPLE XXXV

When the compounds of Examples VIII–XXXI are substituted for the compound of Example I in the process of Example XXXII, methyl methacrylate is colored to produce a shaped plastic material having the color listed for polyester in each example. The compounds of Examples VIII–XXXVII may be used to impart coloration to polystyrene following the procedure of Example XXXIII, and polycarbonate is pigmented with the compounds of Examples VIII–XXXVII following the procedure of Example XXXIV.

What is claimed is:

1. Polyester textile fibers dyed with a compound of the formula

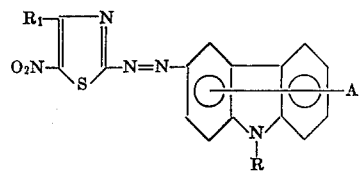

wherein $R_1$ is hydrogen or methyl; R is hydrogen or alk-X, alk being alkylene of up to nine carbon atoms and X being hydrogen, cyano, phenyl, hydroxy, chloro, bromo, or lower alkoxy; and A is hydrogen, halogen, lower alkyl or lower alkoxy.

2. Polyester textile fibers dyed with a compound of the formula

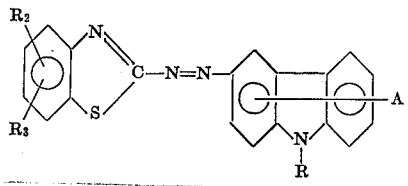

wherein each of $R_2$ and $R_3$ is independently selected from the group consisting of hydrogen, lower alkyl, lower alkoxy, chloro, bromo, and cyano; R is hydrogen or alk-X, alk being alkylene of up to nine carbon atoms and X being hydrogen, cyano, phenyl, hydroxy, chloro, bromo, or lower alkoxy; and A is hydrogen, halogen, lower alkyl or lower alkoxy.

3. Polyester textile fibers of claim 1 dyed with a compound of the formula

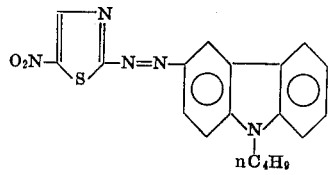

* * * * *